United States Patent [19]
van Steenbrugge

[11] Patent Number: 5,054,022
[45] Date of Patent: Oct. 1, 1991

[54] LOCAL COMMUNICATION BUS SYSTEM COMPRISING A SET OF INTERCONNECTED DEVICES, A CONTROL BUS, AND A SET OF SIGNAL INTERCONNECTIONS, AND A DEVICE AND A SWITCHBOX FOR USE IN SUCH SYSTEM

[75] Inventor: Bernard van Steenbrugge, Eindhoven, Netherlands

[73] Assignee: U.S. Philips Corporation, New York, N.Y.

[21] Appl. No.: 547,575

[22] Filed: Jun. 28, 1990

[30] Foreign Application Priority Data

Dec. 14, 1989 [EP] European Pat. Off. ........ 89203197.2

[51] Int. Cl.⁵ ............................................... H04J 3/02
[52] U.S. Cl. .............................. 370/85.6; 370/85.11; 340/825.5
[58] Field of Search ............... 370/85.11, 58.1, 85.6, 370/85.1; 340/825.5, 825.51

[56] References Cited

U.S. PATENT DOCUMENTS

| | | | |
|---|---|---|---|
| 4,429,384 | 1/1984 | Kaplinsky | 370/85 |
| 4,621,360 | 11/1986 | Inoue | 370/85.11 |
| 4,689,740 | 8/1987 | Moelands et al. | 364/200 |
| 4,706,150 | 11/1987 | Lebizay et al. | 340/825.5 |
| 4,831,358 | 5/1989 | Ferrio et al. | 340/825.5 |
| 4,860,000 | 8/1989 | Kobayashi | 370/85.6 |
| 4,937,816 | 6/1990 | Van Steenbrugge et al. | 370/85.6 |

Primary Examiner—Douglas W. Olms
Assistant Examiner—Min Jung
Attorney, Agent, or Firm—Anne E. Barschall

[57] ABSTRACT

An improved bus system of a type suitable for connecting various consumer devices in the home. The system eliminates the need for either a central control device or a list of interconnections between the consumer devices. Instead a local interconnection table is stored in each device. The invention also uses an automatic priority system to prevent a user from inadvertently destroying earlier established signal paths.

23 Claims, 2 Drawing Sheets

LOCAL COMMUNICATION BUS SYSTEM COMPRISING A SET OF INTERCONNECTED DEVICES, A CONTROL BUS, AND A SET OF SIGNAL INTERCONNECTIONS, AND A DEVICE AND A SWITCHBOX FOR USE IN SUCH SYSTEM

BACKGROUND OF THE INVENTION

The invention relates to a local communication bus system comprising a serial control bus attached to a plurality of devices, that are furthermore pairwise interconnected by respective signal interconnections and include at least one plural-interconnected switchbox means, said system being able to establish a signal path between an initiating or source station and a destination station.

A single-channel control bus has been described in U.S. Pat. No. 4,429,384, herein incorporated by reference. Such a communication bus is particularly suited for transfer of control signals between various devices for consumer entertainment, devices for executing household chores, and devices for producing various maintenance and management control signals in a domestic environment. A different kind of serial bus has been disclosed in U.S. Pat. No. 4,689,740. This particular serial bus has separate clock and data wires. A still different set-up is a single data wire, a single clock wire, and a single word enable wire. A still different set-up is a single data wire, a single bit synchronization wire, and a single word synchronization wire. Serial in this context means that the information transmitted is represented by at most two wire signals, any other wire being exclusively used for controlling and/or synchronizing the transfer.

For simplicity, only the system according to the first referenced type is considered hereinafter. In addition to the control bus, the various devices are pairwise interconnected by signal interconnections. Herein, pairwise means that either exactly two devices are interconnected, or that one particular device operates as signal source, whereas the others function exclusively as signal destinations. An example would be one audio amplifier that can selectively power either one of two (or more) loudspeaker boxes. The signals may be analog or digital and may relate to audio video, or other information. Certain devices, although attached to the control bus, need not be interconnected to such signal interconnection inasmuch as they have little or no signal handling facilities, such as switches, sensors et cetera. For these devices, the control bus would provide a data path of sufficient transport capability. Particular properties of such system are the low level of data processing facilities of many of the interconnected devices, and also the frequent configuration changes encountered inasmuch as many devices are portable and liable to plugging and unplugging in various physical attachment points of the control bus. In typical circumstances, such control bus could be wired to all rooms of a house or appartment and in each wired room have one or more wall-mounted plugs. Of course simpler configurations would also do. The devices often have only a single signal interconnection; anyway, the switchbox means have at least two such signal interconnections, typical values are four to six.

SUMMARY OF THE INVENTION

Among other things, it is an object of the present invention to allow for easy and error-free establishment of a signal path between a source device and a destination device without the need for either a central control device or for the storage of all present and valid pairwise signal interconnections in each relevant device, but allowing for only the storage in each device of a local interconnection table.

It is a further object of the present invention to allow for an easy and error-free establishment of a signal path between a source device and a destination device by providing a protection of a signal path once established. It is another object of the invention to prevent an earlier signal path established from destruction or interference by a later signal path to be established before by the user without knowledge of the earlier signal path.

Among other things, it is still a further object of the invention to provide an automatic priority system for signal paths, so that the user is not unnecessarily troubled with decision making on signal paths to be established and signal paths to be cancelled. The invention, according to one of its aspects, provides a local communication bus system comprising a serial control bus attached to a plurality of devices that furthermore are plug to plug pairwise interconnected by respective signal interconnections and include at least one plural-plug switchbox means, said system for establishing and specifying a signal path between a source device and a destination device comprising:

in each respective device, interconnection table means interrogatibly storing information indicating any other device pairwise interconnected to said respective device, the plug pair so interconnecting that other device and a priority code if any for each interconnection;

in said source device first message generating means for generating, in case said source device and destination device are not pairwise interconnected, on said control bus a messaged Connect control command including a priority code directed to any first switchbox means pairwise connected to said source device and indicating said destination device as well as the priority of the connection to be made and in conjunction therewith a messaged Select control command directed to said destination device for thereto signalling and specifying said establishing;

in the first switchbox means so directed at, interrogating means for interrogating its interconnection table means for identifying the plug connected to said destination device if any and for interrogating the stored priority code if any, and control means for comparing the stored priority code and the received priority code and for in the negative case controlling said first switchbox means as secondary source device for producing a further Connect control command including the priority code received by said first switch box to any second switchbox means connected thereto, until after a first sequence of such Connect control commands the destination device is reached, thereby said signal path is identified as a second sequence of such pairwise interconnections, between associated plug pairs, starting from said source device and terminating in said destination device, whereby said destination device is activated by said Select control signal for effecting the intended signal transfer, said system comprising activating means for in an initializing state activating said interconnection table means. In this respect, the source device is the source of the control message; on the level of the signal transfer it may operate either as signal source, or as signal destination.

Now each device has an interconnection table that must only store a list of all local plugs, explicit or implicit, the name or other indication of the device connected thereto, the latter device's plug used for realizing the interconnection and the priority code if any for each interconnection. The plug may be a physically separated interconnection to a single signal path that is privy to the devices interconnected thereby, the switching being by means of physically exerting connections and disconnections, as the case may be. Alternatively, the switchbox means may interconnect its plugs by means of frequency selecting, in that the signal frequency band on a first plug determines which of the other, frequency-sensitive plugs is connected thereto. In consequence, frequency multiplexing is effected on the first plug. Each switchbox, at any time may interconnect two or more of its plugs, or interconnect plural pairs of its plugs. Before a connection will be made the interrogation means read the stored priority code, for the interconnection to be made, from the interconnection table means and compare the stored priority code with the priority code, which has been received by the device. If the latter overrules the stored priority code (negative result) then the interconnection is made or a messaged Connect Control Command is sent to a second switch box means, all given the condition that the destination device or the second switch box means is present.

Now, if the first switchbox means is not pairwise connected to the intended destination device, it will, by means of the control bus, operate as secondary source device and search any further switchbox means pairwise connected to it. This operation may be executed in a tree organization. In general, the search will terminate after accessing of only a few switchbox means in sequence.

In the above, the Connect control command indicates which device is to operate as destination device (for the control). The Select control command indicates what the destination device is supposed to do. For example, for a video cassette recorder this signal may specify whether the recorder must record video or reproduce video, and for a monitor whether the signal format is YUV or RGB, the operation of the monitor depending thereon.

In an embodiment of the system in accordance with the invention, the system is characterized in that the priority code depends on the function of the selected source and/or destination. In such an embodiment a control command "audio-cassette record" sent to a audio cassette recorder may overrule an audio-interconnection and disrupt an audio signal path used by a CD-player. Alternatively, a control command "VCR-dubbing-record" may overrule an audio-interconnection and disrupt an audio signal path used by the audio cassette recorder for enabling an FM-radio receiver to provide audio signals to the dubbing input of the video cassette recorder. Such priority codes having different levels can be realized by use of a multibit e.g. 6 bit code, wherein the position of the bit in the code is related to the kind of control command (e.g. "VCR-record", "audio-cassette record", "video-play", "audio-play", etc.) If so it is very easy to determine priority by bit by bit comparison of the stored priority code and of the received priority code, received by the (sub-)device.

Of course it is possible also to provide a system in accordance with the invention, characterized in that the priority code depends on the kind of application. In such a system the kind of application: pure audio devices; video devices and e.g. security devices such as a camera for supervision of the entrance of a building and a monitor can be regarded as three different application types, each having a different priority level. The security devices can be given the highest priority level.

In a further embodiment of the invention the system is characterized in that the priority code of the connections to be established for a signal path is set by an externally generated control signal of a user of the system. In a preferred embodiment of the system in accordance with the invention, the system is characterized in that the commands comprising a priority code comprise further a new priority code. The system further includes comparing means for comparing the received priority code with the stored priority code. The comparing means trigger writing means for writing the new priority code at the location of the priority code in the interconnection table means upon overruling of the stored code by the received priority code. In such a system an interconnection with a high priority is made by use of the appended higher priority code and thereafter is protected by the new priority code stored in the interconnection table means. The use of a priority code and a new priority code, which codes have the same bit format, but may be different in priority level, enables an easy way of handling the information-traffic in the relevant devices (switch boxes) and creates a very flexible system.

FURTHER ASPECTS OF THE INVENTION

The invention also relates to a device for use in such system and possibly having various interconnected subdevices, among which at least one switchbox interfacing to other devices.

The invention also relates to a switchbox operating as a device or subdevice.

Further advantageous aspects to the invention are recited in dependent claims.

BRIEF DESCRIPTION OF THE FIGURES

The invention will be disclosed in more particular detail with respect to the appended drawing, in which.

DESCRIPTION OF AN EMBODIMENT AS PREFERRED

Figure 1:
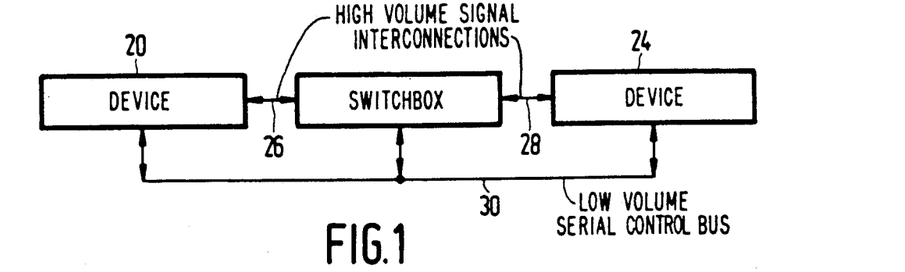
FIG. 1 is a block diagram of an elementary system for use with the invention.

FIG. 1 is a block diagram of an elementary system for use with the invention. The system comprises three devices 20, 22, 24, among which device 22 is a switchbox. Interconnections 26, 28 are high volume signal interconnections, for example, for digital or analog video signals. Interconnection 30 is a serial control bus for relatively low volume messaged control signals.

Figure 2:
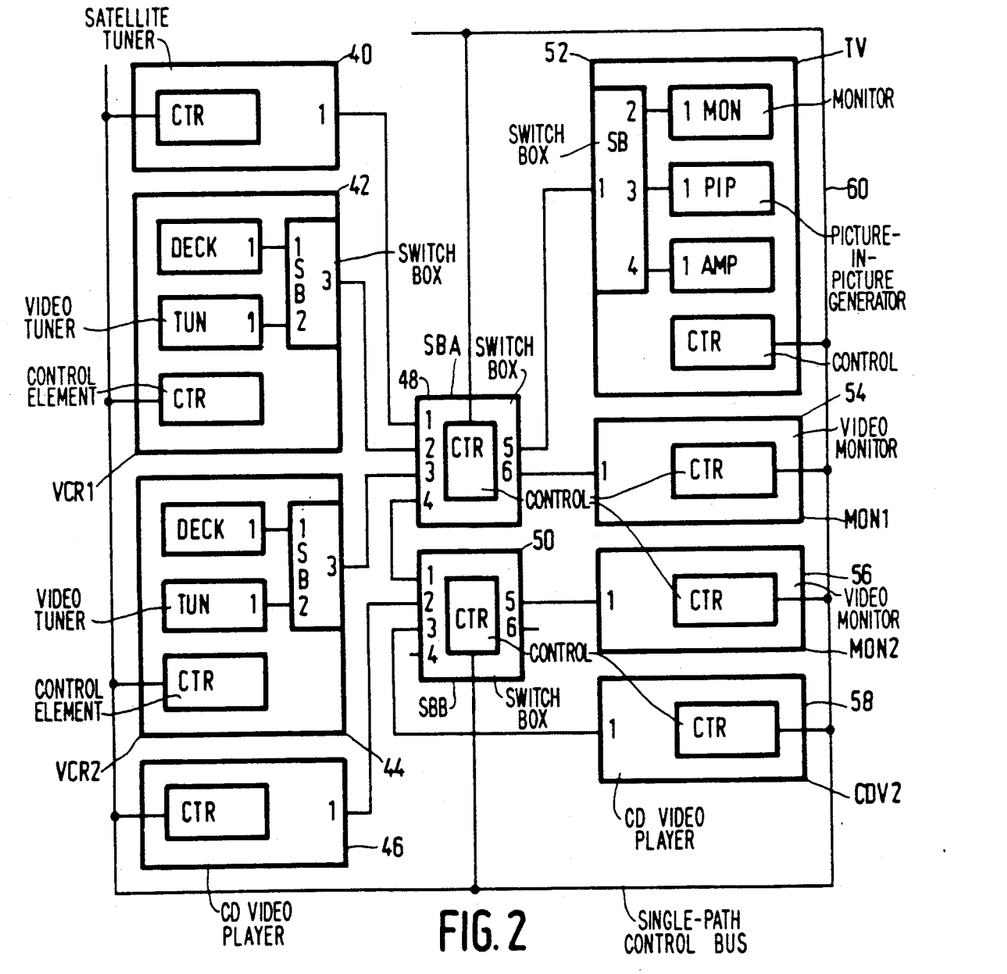
FIG. 2 is a more elaborated block diagram of such system.

FIG. 2 is a more elaborated block diagram of an embodiment for use with the invention. The system is typically video-oriented. Of course, audio-oriented, audio/video-mixed, and other orientations would be feasible as well. There are ten devices: satellite tuner 40, video cassette recorders 42, 44, compact disc video players 46, 58, video monitors 54, 56, TV apparatus 52 and switchboxes 48, 50. Video cassette recorder 42 has as subdevices a cassette deck —DECK—, a video tuner TUN, a control element CTR and a local switchbox SB. TV apparatus 52 has as subdevices monitor MON, picture-in-picture generator PIP, video amplifier AMP, control element CTR, and local switchbox SB. All devices have a control element CTR. All plugs of devices and/or subdevices to the signal interconnections are numbered. These numbers relate to a locally valid plug sequence. All control devices are attached to single-path control bus 60. This may be a coax, twisted pair or optical bus, for example. The control devices will control various operations of the device and, if applicable, its subdevices. In the embodiment shown, the various signal interconnections are all physically separate. Other solutions are possible; for example, interconnections 3 and 5 of switchbox 50 could operate in frequency multiplex with respect to a source signal interconnection of which the frequency band determines which one of monitors 56, 58 is going to effect display. To this effect, the switchbox means may comprise a selectively activatable frequency convertor, or the signal source may already effect such conversion.

Figure 3:
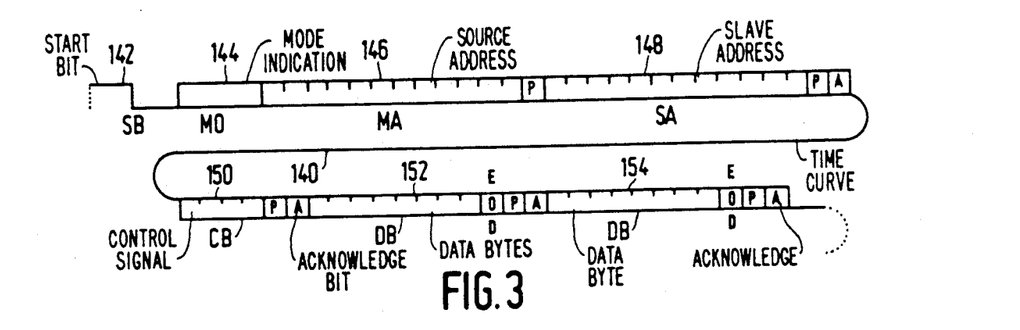
FIG. 3 illustrates a message format.

FIG. 3 illustrates a message format on the control bus. The physical bit shape has been described in the reference. The time has been indicated as curve 140 on which the bits form a contiguous sequence. Start bit 142 is followed by mode indication 144 (1-3 bits) indicating an intended bit cell frequency. Indication 146 contains 12 bits source addres plus parity P. Indication 148 contains a 12 bit slave address plus parity P and acknowledge bit A to be generated by the intended destination on the control bus, which is not necessarily the destination station of the signal path to be established, where it may also be any intermediate station along this path. Indication 150 is a four bit control signal plus parity P and acknowledge signal A. Indications 152, 154 relate to the data bytes, inclusive of an end-of-data signalization, a parity bit, and an acknowledge bit. Control information 150 relates to the operation of the single channel bus and the control devices CTR connected thereto. Data bytes 152, 154 on this level operate as data that are just transmitted. On the next level, they may operate as either data, address, or control information for the various local (sub) devices.

SPECIFICATION OF SIGNALS AND OPERATION IN A TYPICAL EMBODIMENT

Hereinafter various signals to be used for control functions are specified, and also an example of operation in a typical embodiment. Now, for any plug in a subdevice it is known to which other subdevice and plug on that subdevice it is connected physically. For internal connections between a switchbox subdevice and a signal source or signal destination subdevice all in the same device this is known beforehand (e.g. programmed by the device manufacturer); for external connections (signal connector cables) it is given by the user at initialization time. For systems of low complexity, the necessary information is procured according to the so-called —default—principle that is generally used in personal computers and the like. All (sub-)devices comprise interconnection table means for storing for each of its plugs the (sub-)device connected to said plug, the plug of said (sub-)device and the priority code appended to said interconnection. This has been shown in the tables herebelow, notably for the (sub-)devices: SATTUN, VCR1, VCR2, TV, CDV-1, MON-1:

| I-C TABLE SATTUN | |
| --- | --- |
| 01 SB-A | 01 P-CODE |

| I-C TABLE SB-A | |
| --- | --- |
| 01 SATTUN | 01 P-CODE |
| 02 SB-VCR1 | 03 ... |
| 03 SB-VCR2 | 03 ... |
| 04 SB-B | 01 ... |
| 05 SB-TV | 01 ... |
| 06 MON-1 | 01 ... |

| I-C TABLE SB-VCR1 | |
| --- | --- |
| 01 DECK | 01 P-CODE |
| 02 TUNER | 01 ... |
| 03 SB-A | 02 ... |

| I-C TABLE TV | |
| --- | --- |
| 01 SB-A | 05 P-CODE |
| 02 MON | 01 ... |
| 03 PIP | 01 ... |
| 04 AMP | 01 ... |

| I-C TABLE MON2 | |
| --- | --- |
| 01 SB-B | 05 P-CODE |

| I-C TABLE SB-B | |
| --- | --- |
| 01 SB-A | 04 P-CODE |
| 02 CDV-1 | 01 000000 |
| 03 CDV-2 | 01 000000 |
| 04 — | — ... |
| 05 MON-2 | 01 ... |
| 06 — | — ... |

In the interconnection table for each (sub-)device is present from left to right: the plug number of the (sub-)device, the indication of the (sub-)device connected to said plug, the plug number of the latter (sub-)device used for realizing said connection and the priority of said connection shown in the table as: P-CODE. The priority code can be e.g. a six bit code and the: 000 000 may indicate initialization of the system. The priority level can be indicated by the position of the bit 1 in the priority code, so that by easy bit-by-bit comparison the higher level of priority can be found.

Furthermore, any switchbox subdevice knows its current internal interconnections. This means for each of its plugs, the identity of any other plug (zero or more) to which it is currently internally interconnected. All control commands to be specified hereinafter are formatted in the messaged format explained with respect to FIG. 3.

To build up a signal interconnection the bus commands Connect and Select are used. Connect is a command for switchbox (sub)devices. It defines a signal interconnection between a plug of that switchbox (sub)device and another (sub)device that is a source or destination of a signal stream. This latter (sub)device may be directly connected to the switchbox (sub)device, or it may be connected via one or more switchboxes in between. The Select command is directed to signal source and signal destination (sub)devices. It informs a signal source (sub)device that it should supply a signal; or a signal destination (sub)device that it will receive a signal. Also, further specifying information is included.

To release a signal interconnection the commands Disconnect, Deselect-subdevice and Deselect-plug are used: Disconnect is a command for switchbox (sub)devices and may include a new priority code for resetting the stored priority code. This command has the same operands categories as the Connect command: it is used to release a signal path that has been built with a Connect command. If no new priority code is used the stored priority code is set automatically to zero.

Deselect-subdevice is a command for signal destination (sub)devices and signal source (sub)devices. It is used to inform such a (sub)device that it will not receive a signal anymore, or that it no longer needs to produce signals, respectively.

Deselect-plug is a command for switchbox (sub)devices. It is used to inform the switchbox that the signal path via the given plug is no longer needed. If a deselect command is used then also the priority code of the interconnection to be disconnected is erased (set to zero).

Furthermore, to investigate a current signal interconnection a number of requests are used. These are also transmitted on the control bus.

The Connected request is used to verify if the latest Connect command was successful. It is a request for switchbox (sub)devices.

The Connected-to-subdevices request is a request for signal source and signal destination (sub)devices. It is used to investigate if such a (sub)device is currently active, and if so, to what other (sub)device and plug on that subdevice it has currently a signal interconnection.

The Connected-to-switchbox request is a request for switchbox (sub)devices. It is used to investigate, for a given plug of that switchbox, to which other (sub)devices and plugs on these (sub)devices the given plug has currently signal interconnections.

These last two requests (Connected-to-subdevice and Connected-to-switchbox) identify the directly connected subdevices and plugs (if any). The connection in question may be inside the device if switchbox and connected subdevice are both subdevices of the same device, otherwise, it is a signal cable from the switchbox to a plug in another device.

Hereinafter, three examples of the use of the above-mentioned commands will be given:

For example, suppose that CDV-device 46 in FIG. 2 wants to play on (TV, PIP) (52) and therefore must make a signal connection to (TV, PIP).

The following control bus commands and requests can be used to achieve this; the bus messages address the devices and subdevices by name; it is not necessary for the message orginator to know where the message destination device is located physically.

CDV (46):
  CDV sends to Switchbox 50 the command Connect plug 2 including a priority code to (TV, PIP).
  CDV sends to Switchbox 50 Request Connected plug 2 to (TV, PIP).
  CDV repeats this question periodically until an answer "Connected" or "Not connected" is received.

Switchbox (50)
  receives bus Connect command from CDV, and therefore issues another bus Connect command including the priority code to switchbox 48 in the same way CDV 46 had done earlier to switchbox 50. The further parameters for the Connect command are plug 4 (of switchbox 48) and (TV, PIP). No other device receives this command, because in switchbox 50 no TV-PIP subdevice is known to be directly connected to switchbox 50 and also, no switchbox subdevice other than switchbox 48 is directly connected to switchbox 50. However, in more complicated situations, it could prove necessary to execute a tree-like search by means of the bus commands/requests through the interconnected switchbox (sub)devices. It should be noted that there is no a priori restriction to the interconnection pattern of the switchboxes. In connection with the above Connect command, switchbox 50 issues to switchbox 48 the Request connected with the same parameters (plug 4, TV, PIP). Again, this latter request is repeated until an answer, either "Connected" or "Not connected" is received. If the answer received is "Connected", the switchbox 50 makes a connection internally between its plugs 2 (connected to CDV 46) and 1 (connected to switchbox 48) and the new priority code is stored in the interconnection table means. The answer to the Connected request issued by the CDV 46 is now "Connected". If the answer received by switchbox 50 is "Not connected", switchbox 50 does not make any new interconnection between its plugs. If applicable, any existing interconnection is left active. However, if an interconnection is to be cancelled then its priority code is compared with the received priority code. If the existing interconnection has a lower priority code then it will be cancelled and a new interconnection will be made as demanded by the connect command. If the priority code of the existing interconnection is higher than the received priority code then it will be maintained and no new interconnection will be made. The answer given by switchbox 50 to the Connected request issued by the CDV device 46 is now "Not connected".

The switchbox receives the Connect command and the Connected request from switchbox 50. Initially, it does not know to which of the other switchboxes (SB) in devices VCR1 (42), VCR2 (44) and TV (52) the subdevice TV-PIP is actually connected. Therefore, it successively interrogates all of those three switchboxes. As regards the switchbox of TV device 52, the parameters of the command are (plug 1, TV, PIP). As regards the switchbox of device VCR1 (42), the parameters are (plug 3, TV, PIP). The latter command would obviously be not successful, and upon reception of the ensuing answer "Not connected", the switchbox 48 would, if applicable, turn to interrogating another switchbox. In the case of switchbox TV-SB a "Connected" answer would result depending on the local priority code, if any, and the switchbox 48 will then make the connection between its plugs 4 (connected to switchbox 50) and 5 connected to switchbox SB in device 52. The reaction to a "Not connected" answer has been described earlier.

Switchbox in device TV 52:
  This receives the Connect command including the priority code from switchbox 48 and therefore:

issues a Select command to the PIP inside the TV makes internal connection plug 1-plug 3

(TV, SB) answers depending upon the priority code, if any present, to a Connected request from switchbox: "Connected".

PIP in TV:

receives the Select command from (TV, SB) and starts displaying the signal received on the signal interconnection now activated. Next, the operation for changing an interconnection is described. This may imply that in a particular switchbox device one interconnection is made (or a plurality of interconnections is made), while one or more other interconnections are interrupted. For example, say connection 2-5 holds in the switchbox 48, and the switchbox is changed to connection 2-6 (and connection 2-5 is now broken, priority is overruled). Now the following commands are issued.

Switchbox:

because connection to plug 5 of the switchbox is broken: Switchbox to (TV, SB): Deselect-plug 1, set priority code to zero.

SB in TV:

receives the "Deselect-plug 1, set priority code to zero" command from Switchbox.

say plug 1 of (TV, SB) is currently connected to plug 2 of (TV, SB). Then (TV, SB) issues the command "Deselect-subdevice" to (TV, Mon), because plug 2 of (TV, SB) is connected to (TV, Mon).

Mon in TV:

receives the "Deselect-subdevice" command. This means that it does not receive signal input anymore. Therefore (TV, Mon) may decide to go in standby, for example.

In case the channel to be broken runs through more switchboxes a similar search may be made as the one executed for setting up a connection. However, inasmuch as every (sub)device knows its internal connections realized for setting up the path, the search can follow this path and thus be executed more quickly. In conjunction with the disconnection operation, the changed interconnection may be activated in the same manner as described earlier.

Next, the Operation for Tracing an Actual Connection (OTAC) is described.

For example, suppose that the deck of VCR1 (42) wants to know the source of a monitor signal, that is, in fact, provided by Monitor device 56. However, initially this information is not present in device 42. The following requests are now used. First, the initiating subdevice (VCR1, Deck) issues a Connect-to-Subdevice request to Monitor 56. If this monitor is in an active state, it will then answer that it is connected to plug 5 of switchbox 50. Thereupon, subdevice (VCR1, Deck) issues a "Connected to Switchbox 50, plug 5" request to switchbox 50. In case plugs 1, 5 of switchbox 50 are presently interconnected, switchbox 50 will answer this request with -plug 4 of switchbox 48-. Now, in switchbox 48 plugs 3 and 4 may be interconnected, the former being connected the switchbox subdevice of VCR2 (44). Thus, upon being addressed by means of the "connected to switchbox 48, plug 4 connected-to-subdevice" request, switchbox 48 will answer by "plug 3 of (VCR2, SB)". Finally, subdevice (VCR1, Deck) issues the "connected to switchbox VCR2, SB), plug 3 to subdevice (VCR2, SB). Say, plug 3 of (VCR2, SB) is currently connected to plug 1 of (VCR2, SB). This plug is connected to (VCR2, Deck). Hence (VCR2, SB) answers on the request: (VCR1, Deck).

(VCR1, Deck) now knows that Monitor has a signal connection to (VCR2, Deck). (VCR1, Deck) may now send to (VCR2, Deck) a request to verify if it is active.

Now, the requests and commands contain various operands and control codes, such as the priority code. In a prefered embodiment a new code is also used, which is, as described before, substituted for the priority code stored in the interconnection table means, if the stored code is overruled by the received priority code. The device address normally has twelve bits, subdivided into three fields: the service type (e.g. specifying audio-video devices) of 4 bits, the device type of 5 bits, and the device number of 3 bits. Together with 4 stuffing bits, this fills two message bytes. In similar way, a 10 bit subdevice address is defined. The plug number is specified in one byte; 64 different values are defined. A connect command has a one byte opcode, two operands specifying plug number, device/subdevice address of input and output of the connection, and the priority code and the new code, each having six bits, respectively. The disconnect command differs primarily with respect to its opcode. The select command has a one byte opcode. It may specify a signal type. No address parameter is necessary. The deselect subdevice command has a similar format. The deselect-plug command has the same format, enhanced with a plug number. The connected request has a one byte opcode, two operands, specifying plug number and device/subdevice address. The answer contains one or two bytes to the originator of the request, specifying the result. The connected-to subdevice request primarily consists of a one byte opcode. The answer may specify the following:

subdevice in standby (only 2 opcode bytes);
subdevice active; specifying device/subdevice address and signal type communicated with connected (sub)device;
idem, externally connected to switchbox; specifying device/subdevice, signal type and plug number.

The connected-to-switchbox request specifies request code and plug number. The answer specifies the plug number(s), and the relevant device/subdevice addresses.

EXAMPLE OF A SWITCHBOX DEVICE

Figure 4:
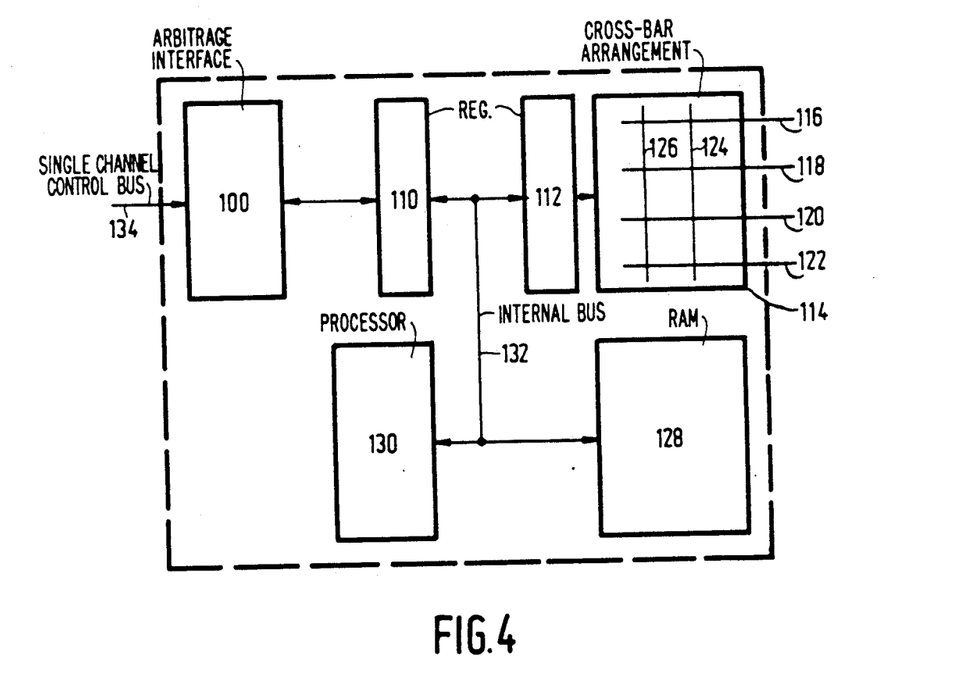
FIG. 4 is a block diagram of a switchbox.

FIG. 4 is a block diagram of a switchbox (sub)device. Line 134 indicates a single-channel control bus according to the reference. Thereto, element 100 is the interface that accounts for arbitrage on the bit level, recognizing the own address of the switchbox, formatting messages and extracting data. Such data then is sent to byte register 110. Register 110 interfaces to internal bus 132, on which traffic is controlled by processor 130 according to general data processing principles. Generally no specification of address/data/control paths has been given. Processor 130 interrogates register 110, decodes various opcode and other control bytes such as the received priority code as well as the new code and if necessary, controls interconnection of the four signal connections 116 ... 122 by means of cross-bar arrangement 114; by means of two leads 124, 126 two arbitrary pairs can be formed between connections 116 ... 122. The actual control is effected by register 112, that is also loaded by processor 130 via bus 132. The data, such as device/subdevice addresses/plug numbers/signal types and priority codes relating to the four connections 116 ... 122 are memorized in interconnection RAM 128 which has allocated respective storage space to each of connections 116 ... 122. Processor 130 thus continually controls all other elements. With respect to the signals on connections 116 ... 122 the switchbox is organizationally passive. For simplicity, organization on a lower level than processor 130 has not been shown: program store, ALU, instruction decoding, register stack, data RAM, bus interface to bus 132, all generally may be of conventional construction and thus will perform as interrogation and comparison means for interrogating the memory 128 comprising the interconnection table means in order to compare the stored priority code with the received priority code (in 110). Further the processor 130 will perform as code writing means for writing the new code (temporarily stored in byte register 110) in the very location of the priority code in the interconnection table means in memory 128, if the received priority code has overruled other stored priority code.

The other devices may have a similar set-up. However, inasmuch as they have only one signal interconnection, no cross-bar 114 is necessary and also, other control is simplified. Notably, the interconnection RAM may be replaced by one or only a few hardware registers. On another level, such other devices could be of far greater complexity than the switchbox, but this latter complexity is unrelated to the tactics of the network function.

All of the foregoing has been shown by the way of an example, e.g. it is easy to understand that it is possible to connect a camera (CAM) having an output plug 01 and a controller (CRT) inside to the system shown in FIG. 2. The output plug (01) could be connected to the switchbox SBB plug 6 and the controller (CRT) to the D2B control bus 60. Then the interconnection table of the camera would be: 01 SB-B 06 P-CODE. The interconnection table of switchbox SBB would change for its plug 6 and would be: 06 CAM 01 P-CODE. If the camera is used for security purposes then it can be given a fixed high priority e.g. P-CODE=100.000. Then upon detection of a motion or of infra red radiation by a suitable detector the camera is switched on and the supervised area is imaged on MON1and e.g. recorded on VCR2. The signal path from the camera to VCR2 will be created with the highest priority.

I claim:

1. A local communication bus system comprising
a) a serial control bus;
b) a plurality of devices attached to the serial control bus, which devices each have at least one plug and which devices are pairwise interconnected between their respective plugs, at least one of the devices being a plural-plug switchbox means;
c) means for establishing and specifying a signal path between a source device and a destination device, which establishing means comprises:
   i) in each respective device, respective interconnection table means for storing information indicating:
      A) any other device pairwise interconnected to said respective device;
      B) a respective pair of plugs for each said other device, said respective pair of plugs connecting said other device and said respective device, which pair of plugs comprises a first plug in said respective device and a second plug in said other device; and
      C) for each such respective pair of plugs, whether a priority code has been assigned and, if so, what priority code has been assigned to the respective connection between the respective pair of plugs;
   ii) in said source device, first message generating means for generating on said control bus
      A) a connect control command, when said source device and destination device are not pairwise interconnected, said connect control command including
         I) a priority code directed to any said switchbox means pairwise interconnected to said source device, which priority code indicates a priority of the connection to be made; and
         II) an indication of said destination device; and
      B) a select control command, directed to said destination device, for signalling and specifying the signal path to said destination device;
   iii) in each respective switchbox means,
      A) respective interrogating means for
         I) searching the respective interconnection table means in the respective switchbox means in order to identify any respective plug which is pairwise connected to said destination device; and
         II) locating the stored priority code corresponding to the destination device, if any; and
      B) respective control means for,
         I) comparing the stored priority code and a received priority code which is received from the source device, and
         II) if the received priority code indicates a higher priority than the stored priority code, and if the respective switchbox means is not connected directly to the destination device, controlling said first switchbox means to act as a secondary source device, which controlling includes
            α) producing a further connect control command which includes the received priority code;
            β) transmitting said further connect control command, along with the select control command, to a further one of the switchbox means which is pairwise connected to the respective switchbox means;
so that the plurality of switchbox means iteratively reach the destination device after a sequence of Connect control commands by identifying a second sequence of pairwise interconnections, starting from said source device and terminating in said destination device, which second sequence constitutes said signal path, whereby said destination device receives and is activated by said select control command.

2. The system of claim 1, wherein each respective switchbox means further comprises means, responsive to the comparing means, for writing a new code at the location of the stored priority code when the received priority code indicates a higher priority than the stored priority code.

3. The system of claim 1 or 2, wherein
a) said source device further comprises second message generating means for generating and transmitting via the signal path
   i) a disconnect control command, indicating said destination device, and
   ii) a deselect control command, for said destination device, b) each respective switchbox means connected in said signal path further comprises
   i) means for identifying, using the respective interconnection table means, a plug of the respective switchbox means corresponding to said signal path; and
   ii) means for, when a priority code transmitted with said disconnect control command is higher than a stored priority code associated with the plug, and when said destination device is not directly connected to the respective switchbox means, generating and transmitting a further disconnect control command along with the deselect control command to said further one of the switchbox means;
   whereby said disconnect control command is iteratively transmitted along with said deselect control command, along said signal path, thereby signalling abandonment of said signal path and deactivating said destination device with respect to said path; and
c) within each device, means for setting the stored priority codes corresponding to said signal path to zero once said destination device is deactivated with respect to said signal path.

4. The system of claim 1 or 2 wherein
a) at least one of said switch box means is an internal switchbox sub-device within said source device; and
b) said connect control command
   i) specifies a priority between a particular plug of the internal switchbox sub-device and a particular destination device;
   ii) informs the destination device of an intended signal transfer; and
   iii) specifies said transfer.

5. The system of claim 4, wherein
a) said source device has second message generating means for generating and transmitting via the signal path
   i) a disconnect control command, indicating said destination device, and
   ii) a deselect control command, for said destination device,
b) each switchbox means connected in said signal path includes
   i) means for identifying, using the respective interconnection table means, a plug within the respective switchbox means corresponding to said signal path; and
   ii) means for, when a priority code transmitted with said disconnect control command is higher than a stored priority code associated with the plug, and when said destination device is not connected directly to the respective switchbox means, generating and transmitting a further disconnect control command along with the deselect control command to said further one of the switchbox means;
   whereby said disconnect control command is iteratively transmitted along with said deselect control command, along said signal path, thereby signalling abandonment of the signal path and deactivating said destination device with respect to said path;
c) said disconnect control command comprises commands to
   i) disconnect a local plug of a switch sub-device which is internal to the source device, which local plug is part of the signal path; and
   ii) disconnect a remote plug of the switchbox means, which remote plug is part of the signal path; and
d) within each device, the stored priority codes corresponding to said signal path are reset in response to said disconnect control command and said deselect control command.

6. The system of claim 1 or 2 wherein said first message generating means comprises means for continuously producing a connected request signal, after said connect control command, to evoke a positive or negative indication as to whether said signal path is connected, which positive or negative indication may come from any device or sub device along said signal path.

7. The system of claim 1 or 2 wherein at least one of the devices further comprises
a) at least one subdevice having at least one plug for connecting to another device; and
b) means for producing a connected-to-subdevice request for requesting
   i) information as to whether a particular one of the at least one subdevice is active, and
   ii) if the particular subdevice is active, what plug on what other device the particular subdevice is communicating with.

8. The system of claim 1 or 2 wherein at least one of the devices further comprises
means for producing a connected-to-switchbox request signal for requesting information, with respect to a particular plug of a particular switchbox means, as to which other devices, subdevices, and plugs on these other subdevices, the particular plug has an active signal connection.

9. The system of claim 1 or 2, wherein
a) said source device further comprises second message generating means for generating and transmitting via the signal path
   i) a disconnect control command, indicating said destination device, and
   ii) a deselect control command, for said destination device,
b) each respective switchbox means connected in said signal path further comprises
   i) means for identifying, using the respective interconnection table means, a plug of the respective switchbox means corresponding to said signal path; and
   ii) means for, when a priority code transmitted with said disconnect control command is higher than a stored priority code associated with the plug, and when said destination device is not connected directly to the respective switchbox means, generating and transmitting a further disconnect control command along with the deselect control command to said further one of the switchbox means;
   whereby said disconnect control command is iteratively transmitted along with said deselect control command, along said signal path, thereby signalling abandonment of said signal path and deactivating said destination device with respect to said path;
c) within each device, means for setting the stored priority codes corresponding to said signal path to zero once said destination device is deactivated with respect to said signal path;

d) at least one of said switch box means is an internal switchbox sub-device within said source device; and e) said connect control command
   i) specifies a priority between a particular plug of the internal switchbox sub-device and a particular destination device;
   ii) informs the destination device of an intended signal transfer; and
   iii) specifies said transfer.

10. The system as claimed in claim 1 or 2, wherein at least one of the devices comprises a switchbox subdevice and at least two further subdevices, said further subdevices being pairwise connected to said switchbox subdevice by means of respective signal interconnections, each signal interconnection comprising a pair of plugs, which pair of plugs comprises a first plug in the switchbox subdevice and a second plug in a respective one of the further subdevices, said switchbox subdevice being for establishing signal connections outside said at least one device, said switchbox subdevice having interconnection table means containing a table indicating any subdevice and pair of plugs interconnected within said device as well as a priority code for each possible interconnection between pairs of plugs.

11. The system as claimed in claim 1 or 2, wherein at least one switchbox means comprises
   at least three plugs for pairwise connection to at least three other devices and
   a buffer register for storing received commands, addresses, and a priority code,
   a processor and
   a memory for storing at least an interconnection table including a priority code for each possible interconnection.

12. A system as claimed in claim 1 or 2, characterized in that, the priority code depends on the function of the selected source and/or destination.

13. A system as claimed in claim 1 or 2, characterized in that, the priority code depends on the kind of application.

14. A system as claimed in claim 1 or 2, characterized in that, the priority code of the connections to be established for a signal path is set by an externally generated control signal of a user of the system.

15. A source device for use in a local communication bus system which includes a) a serial control bus; and b) a plurality of devices attached to the serial control bus, which devices each have at least one plug and which devices are connected between pairs of their respective plugs, at least one of the devices being a plural-plug switchbox means,
   which source device comprises means for establishing and specifying a signal path between the source device and a destination device, which establishing means comprises:
   i) interconnection table means for storing information indicating:
      A) any other device connected via a single pair of plugs to said source device;
      B) a respective pair of plugs for each said other device, said respective pair of plugs connecting said other device and said source device;
      C) for each said respective pair of plugs, a respective indication of whether and what priority code has been assigned to the corresponding connection;
   ii) first message generating means for generating
      A) a Connect control command, when said source device and destination device are not connected via a single pair of plugs, on said control bus, said Connect control command including
         I) a priority code directed to any said switchbox means connected via a single pair of plugs to said source device, which priority code indicates a priority of the connection to be made; and
         II) said destination device; and
      B) a Select control command, directed to said destination device, for signalling and specifying the signal path to said destination device.

16. The device of claim 15, wherein said first message generating means comprises means for continuously producing a connected request signal, after said connect control command, to evoke a positive or negative indication as to whether said signal path is connected, which positive or negative indication may come from any device or sub device along said signal path.

17. The device of claim 15, further comprising
   a) second message generating means for generating and transmitting via the signal path
      i) a disconnect control command, indicating said destination device, and
      ii) a deselect control command, for said destination device,
      so that said disconnect control command is iteratively transmitted along with said deselect control command, along said signal path, to signal abandonment of said signal path and deactivate said destination device with respect to said path; and
   b) means for setting stored priority codes corresponding to said signal path to zero once said destination device is deactivated with respect to said signal path.

18. A switchbox device for use in a local communication bus system which includes a) a serial control bus; and b) a plurality of devices attached to the serial control bus which switchbox device comprises:
   i) a plurality of plugs for coupling with the other devices;
   ii) interconnection table means for storing information indicating
      A) any other device which is connected to the switchbox device via a single pair of plugs;
      B) a respective pair of plugs for each said other device, said respective pair of plugs connecting said other device and said switchbox device, which pair of plugs comprises a first plug in said switchbox device and a second plug in said other device;
      C) for each such respective pair of plugs, whether a priority code has been assigned and, if so, what priority code has been assigned to the respective connection between the respective pair of plugs;
   iii) interrogating means for, responsive to a connect control command received on said serial bus, which connect control command indicates a destination device,
      A) searching the interconnection table means to identify any respective plug which is connected to said destination device; and B) locating the stored priority code corresponding to the destination device, if any; and iv) control means for
A) comparing the stored priority code and a received priority code, received from a source device;
B) if the received priority code indicates a higher priority than the stored priority code, and if the switchbox means is not connected to the destination device, controlling the switchbox means to act as a secondary source device, which controlling includes
  I) producing a connect control command which includes the received priority code;
  II) transmitting said connect control command, along with a select control command for the destination device, to a further switchbox means which is connected to the switchbox means;
so that the switchbox device, in conjunction with the further switchbox means, iteratively effects a signal path from the source device to the destination device after a sequence of connect control commands, by identifying a sequence of connections via respective single pairs of plugs.

19. The device of claim 18 that is an internal sub-device in a device which also contains at least two further sub-devices, said further subdevices each being connected by to said switchbox sub-device via a respective single pair of plugs, a respective first one of each pair of plugs being in the switchbox sub-device and a respective second one of each pair of plugs being in on of the further sub-devices.

20. The device of claim 18, wherein
a) the plurality of plugs contains at least three plugs;
b) the interconnection table means comprises a processor and memory; and
c) the device further comprises a buffer register for storing received commands, addresses and a priority code.

21. The device of claim 18, further comprising
a) means for identifying, using the respective interconnection table means, a plug of the respective switchbox means corresponding to said signal path; and
b) means for, when a priority code transmitted with a disconnect control command from the source device is higher than a stored priority code associated with the plug, and when said destination device is not directly connected to the switchbox device, generating and transmitting a further disconnect control command along with a deselect control command, from the source device, to said further switchbox means; whereby said disconnect control command is iteratively transmitted along with said deselect control command, along said signal path, thereby signalling abandonment of said signal path and deactivating said destination device with respect to said path; and
c) means for setting the stored priority codes corresponding to said signal path to zero once said destination device is deactivated with respect to said signal path.

22. The device of claim 15, 17, 18 or 21 further comprising
a) at least one subdevice having at least one plug for connecting to another device; and
b) means for producing a connected-to-subdevice request for requesting
  i) information as to whether a particular one of the at least one subdevice is active, and
  ii) if the particular subdevice is active, what plug on what other device the particular subdevice is communicating with.

23. The device of claim 15, 17, 18, or 21
means for producing a connected-to-switchbox request signal for requesting information, with respect to a particular plug of a particular switchbox means, as to which other devices, subdevices, and plugs on these other subdevices, the particular plug has an active signal connection.

* * * * *

UNITED STATES PATENT AND TRADEMARK OFFICE
CERTIFICATE OF CORRECTION

PATENT NO. : 5,054,022
DATED      : October 1, 1991
INVENTOR(S): Bernard van Steenbrugge It is certified that error appears in the above-identified patent and that said Letters Patent is hereby corrected as shown below:

Title page, insert item [62]

--This application is a continuation-in-part of U.S. Application Serial Number 7/410,389 filed September 20, 1989, abandoned.--

IN THE CLAIMS:

Column 13, Claim 3, line 22, after "said" insert --signal--.

Claim 5, line 66, after "said" insert --signal--.

Column 14, Claim 9, line 66, after "said" insert --signal--.

Column 16, Claim 17, line 36, after "said" insert --signal--.

Column 17, Claim 18, line 2, after "and" start a new paragraph with iv) control.

Signed and Sealed this

Twenty-second Day of June, 1993

Attest:

MICHAEL K. KIRK

Attesting Officer    Acting Commissioner of Patents and Trademarks